United States Patent
Talabathula et al.

(10) Patent No.: US 10,218,162 B2
(45) Date of Patent: Feb. 26, 2019

(54) HIGH VOLTAGE AERIAL CABLE SPACER

(71) Applicant: Marmon Utility, LLC, Milford, NH (US)

(72) Inventors: Shravani Talabathula, Nashua, NH (US); Brian Boisclair, Goffstown, NH (US); Edward Laughlin, Lowell, MA (US); Ashish Munot, Andover, MA (US)

(73) Assignee: MARMON UTILITY, LLC, Milford, NH (US)

( * ) Notice: Subject to any disclaimer, the term of this patent is extended or adjusted under 35 U.S.C. 154(b) by 11 days.

(21) Appl. No.: 15/654,072

(22) Filed: Jul. 19, 2017

(65) Prior Publication Data

US 2018/0026430 A1     Jan. 25, 2018

Related U.S. Application Data

(60) Provisional application No. 62/364,061, filed on Jul. 19, 2016.

(51) Int. Cl.
*H02G 7/12* (2006.01)
*H02G 7/20* (2006.01)

(52) U.S. Cl.
CPC ............... *H02G 7/12* (2013.01); *H02G 7/20* (2013.01); *H02G 7/125* (2013.01)

(58) Field of Classification Search
CPC ............. H02G 7/12; H02G 7/20; H02G 7/125
See application file for complete search history.

(56) References Cited

U.S. PATENT DOCUMENTS

| | | | | |
|---|---|---|---|---|
| 3,076,865 A | * | 2/1963 | Volk | H02G 7/12 |
| | | | | 174/146 |
| 3,268,655 A | | 8/1966 | Haigh et al. | |
| 3,300,576 A | * | 1/1967 | Hendrix | H02G 7/12 |
| | | | | 174/146 |
| 3,582,983 A | * | 6/1971 | Claren | H02G 7/125 |
| | | | | 174/146 |
| 3,613,104 A | * | 10/1971 | Bradshaw | H02G 7/125 |
| | | | | 174/72 R |
| 3,617,609 A | * | 11/1971 | Tuttle | H02G 7/125 |
| | | | | 174/146 |
| 3,748,370 A | * | 7/1973 | Dalia | H02G 7/125 |
| | | | | 174/42 |
| 4,012,581 A | * | 3/1977 | Hawkins | H02G 7/125 |
| | | | | 174/146 |
| 4,020,277 A | | 4/1977 | La Chance, Sr. et al. | |

(Continued)

FOREIGN PATENT DOCUMENTS

WO     2015103702 A1     7/2015

*Primary Examiner* — William H Mayo, III
*Assistant Examiner* — Krystal Robinson
(74) *Attorney, Agent, or Firm* — Hayes Soloway PC (57) ABSTRACT

Devices and systems for supporting and spacing aerial cables of high voltage of 69 kV or above from a support cable are disclosed. The disclosed systems and devices may include a top piece configured to engage the support cable, a first arm, a second arm, and a third arm, each having a distal end and a proximal end, wherein the proximal ends of the first, second, and third arms are connected to the top piece. The devices and systems may also include a cable fastening system located at each of the distal ends of the first, second, and third arms.

20 Claims, 8 Drawing Sheets

(56) References Cited

U.S. PATENT DOCUMENTS

| | | | |
|---|---|---|---|
| 5,371,320 A * | 12/1994 | Torok | H02G 7/125 |
| | | | 174/146 |
| 5,700,980 A | 12/1997 | Bello et al. | |
| 9,022,357 B2 * | 5/2015 | Argyle | H02G 1/06 |
| | | | 254/134.3 PA |
| 9,444,240 B2 * | 9/2016 | Argyle | H02G 7/12 |

* cited by examiner

HIGH VOLTAGE AERIAL CABLE SPACER

CROSS REFERENCE TO RELATED APPLICATION

This application claims the benefit of U.S. provisional application Ser. No. 62/364,061 filed on Jul. 19, 2016, the contents of which are expressly incorporated herein by reference.

BACKGROUND

Electric power transmission and distribution commonly relies upon cables strung overhead. Overhead conductor cables are commonly suspended from messenger cables which are typically made of high strength alloys. Messenger cables are supported on poles or towers and support conductor cable spacers arranged at spaced intervals along the messenger cable. In practice, a single spacer is used to support all three low voltage conductor cables in a three-phase system and the spacer simultaneously maintains a spaced relation between each of the conductor cables. Prior art spacers have been attached to the messenger cable and to the conductor cables in order to save space and to maintain appropriate distances between suspended conductor cables.

U.S. Pat. No. 4,020,277 issued Apr. 26, 1977 to Hendrix Wire & Cable Corporation discloses a spacer for aerial cables. The disclosed spacer includes a body member having at least one generally arcuate cable-retaining means adapted to engage a surface of the conductor cable and retain the cable in a concave seat of the spacer. One end of the cable-retaining means is pivotally supported on the body member. Generally arcuate ratchet tooth means are provided adjacent the other end of the cable-retaining means and arcuate ratchet tooth means are provided on the body member outwardly of the concave seat. The teeth of the retainer ratchet tooth means engage with the teeth of the body member ratchet tooth means when the retaining means is rotated about its pivotal support, thereby firmly retaining the conductor cable in the concave seat.

Since many power circuits require three phase electric power, it is often convenient to suspend conductor cables in groups of three using spacers. However, it has been found that the prior art spacers are not satisfactory for high voltage conductor cables, i.e., voltage at or above 50 kV, e.g., 69 kV, 115 kV or 138 kV (phase to ground) used in three-phase power transmission. The voltage difference between the cables requires greater spacing than low voltage cables require, and greater voltage differences between cables require larger spacers. The larger cables, larger spacers, and larger voltage create cost problems that render prior art spacer designs unsatisfactory.

Prior art spacer systems are also incapable of retaining high voltage cables reliably in the event of certain problems with power transmission, e.g., a short circuit. When power transmission cables experience a short or arc, the cables buckle, which translates significant force to the spacers. High voltage cables generate greater force with a short than do low voltage cables and testing has shown that prior art spacers cannot handle the force of a buckling high voltage cable.

High voltage applications currently employ spacers only in direct current (DC) systems, which do not have the issue of significant voltage differences between the cables and the attendant problems thereof experienced in AC systems. High voltage AC conductor cables are typically suspended from poles without the use of spacers, in order to ensure sufficient distance between suspended cables. However, hanging cables that are oriented side-by-side in the same plane requires a wider footprint than would be required if the use of spacers were possible. Furthermore, when spacers cannot be used, poles must generally be located nearer to one another than would be the case if spacers could be used.

SUMMARY

Aspects of the subject disclosure include devices and systems for supporting and spacing three-phase power, high voltage aerial cables including a top piece configured to engage and be supported by a support or messenger cable, a first arm, a second arm, and a third arm, each arm having a distal end and a proximal end. In some embodiments, the proximal ends of the first, second, and third arms are connected to the top piece. A cable fastening system may be located at each of the distal ends of the first, second, and third arms. In some embodiments, the cable fastening system may be hingedly connected to the arm of the spacer. In accordance with some embodiments, each cable fastening system may comprise a cable clamp including a cable seat portion, a removable top portion, and at least one fastener for removably connecting the top portion to the cable seat portion. Further, in accordance with some example embodiments, the cable seat portions may include a first concave face and the removable top portion may include a second concave face. In these and other embodiments, the first and second concave faces may be adapted to grip or slidably engage a high voltage aerial cable. Also, the top piece may comprise a crimped metal brace, in some embodiments. Additionally, in some cases, the first, second, and third arms may comprise a fiberglass material and, in some embodiments, the first, second, and third arms may include insulating fins attached thereto.

According to yet further aspects, the first and second high voltage aerial cables may be 50 kV to 69 kV transmission cables, or greater-than 69 kV transmission cables, e.g., 115 kV, or 138 kV transmission cables. The distal ends of the first and second arms may be separated by a first separation distance when the first and second arms support first and second high voltage aerial cables, respectively.

According to still further aspects, first and second cross support portions may be connected to the first and second arms, respectively, and the first and second cross support portions may be connected to the third arm and adapted to maintain the first separation distance between the distal ends of the first and second arms. Further, the first, second, and third arms, and the cross support portions may all be fabricated from the same material in some embodiments, e.g., fiberglass.

BRIEF DESCRIPTION OF THE DRAWINGS

Many aspects of the disclosure can be better understood with reference to the following drawings. The components in the drawings are not necessarily to scale, emphasis instead being placed upon clearly illustrating the features of example embodiments. Moreover, in the drawings, like reference numerals designate corresponding parts throughout the several views.

DETAILED DESCRIPTION

Figure 1:
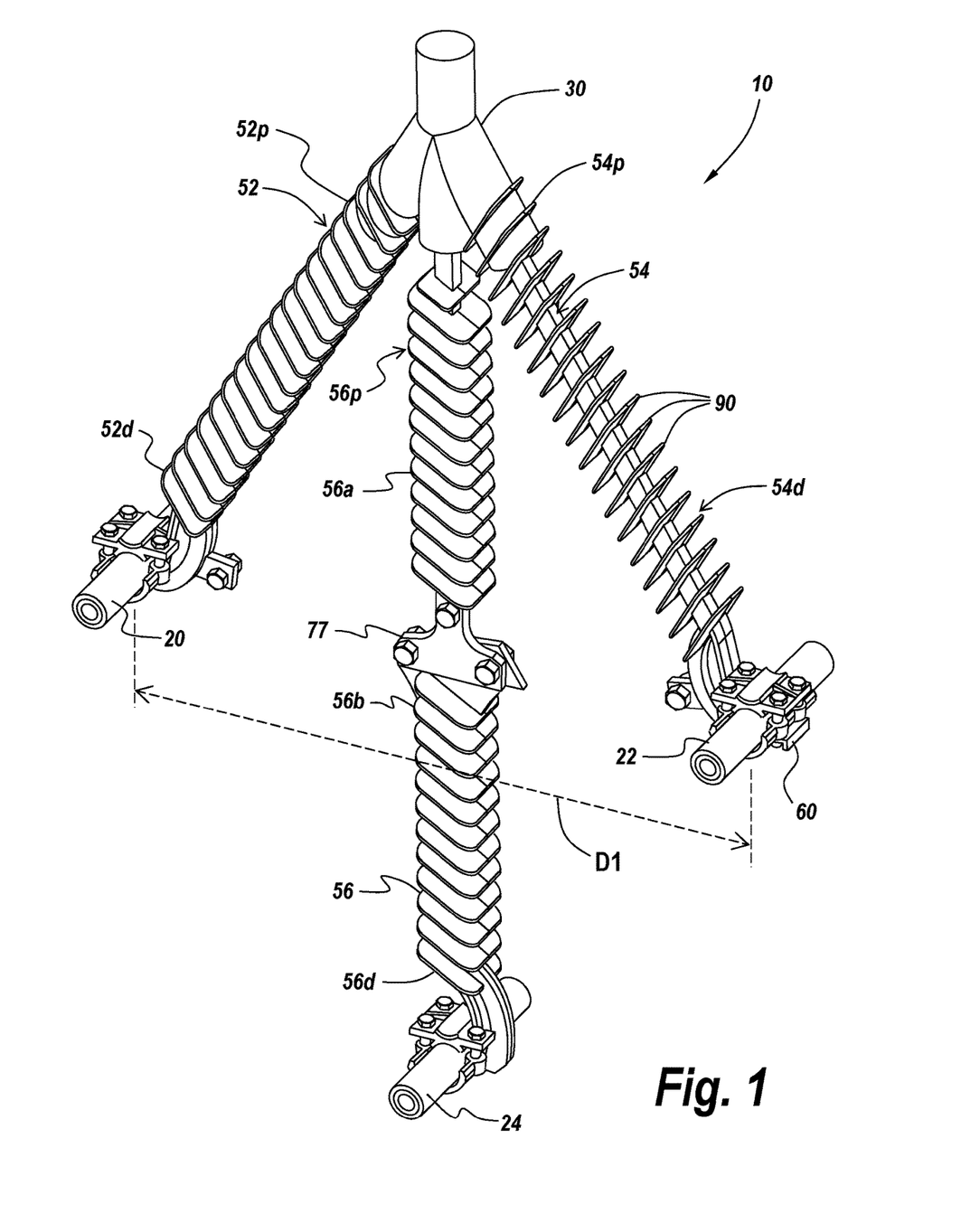
FIG. 1 is a view of a cable retaining device and system in accordance with embodiments of the present disclosure.

FIG. 1 illustrates a spacer device 10 for supporting and spacing high voltage aerial cables 20, 22, 24. High voltage aerial cables 20, 22 and 24 are adapted to conduct over 50 kV in a power transmission system. High voltage aerial cables 20, 22 and 24 may be adapted to conduct 69 kV, 115 kV or 138 kV, for example. The spacer device 10 includes a top piece 30 configured to engage and be supported by a support or messenger cable (not illustrated). Top piece 30 may be further configured to support a first arm 52, a second arm 54, and a third arm 56. First, second, and third arms 52, 54, 56 may be constructed of any appropriate material, including, but not limited to, fiberglass. First, second, and third arms, 52, 54, 56 may, in some embodiments, include a composite material and, in these and other embodiments, may comprise a composite over-molded material. For example, in particular example embodiments, arms 52, 54, and/or 56 may be formed, at least in part, by over molded fiberglass with one or more electrically insulating materials, such as high density polyethylene, polymer, rubber, or other similar materials. Further, first, second, and third arms 52, 54, 56 may, in some embodiments, have crimped connections with any appropriate material, including, but not limited to steel, iron, or aluminum. In some embodiments, crimped connections may include over molded fiberglass using electrically insulating material. Further, each of the first, second, and third arms 52, 54, 56 may be constructed of like materials, e.g., electrically insulating materials, with the material of each arm having the same dielectric constant.

Top piece 30 may be adapted to support each of the first, second, and third arms 52, 54 and 56 while maintaining appropriate distances and angles between the high voltage cables supported by arms 52, 54, and 56. Top piece 30 may be described as a cable support including an insulating trunnion-type clamp supported by a cast steel, iron, or aluminum connection, crimped or bolted to first, second, and third arms 52, 54, 56. Top piece 30 may be directly connected to first, second, and third arms 52, 54, 56 without supports, in some embodiments. The trunnion of top piece 30 may be fabricated out of any appropriate electrically-insulating material. Connectors used to fasten the various parts of the device may be fabricated of metal, plastic, or other insulative materials, as appropriate.

Top piece 30 may be constructed with any appropriate material, including, but not limited to cast steel, iron, or aluminum. In some embodiments, top piece 30 may be connected to first, second, and third arms 52, 54, 56 using one or more bolts, while in other embodiments, top piece 30 may be securely crimped to arms as one unit. In either case, the support may be over molded with an electrically insulating material. Therefore, top piece 30 may, in some embodiments, be constructed of appropriately rigid and durable material(s). Such material(s) may include a crimped metal such as stainless steel, thereby making a crimped metal brace, while other possible materials include steel, iron, or aluminum. In some embodiments, top piece 30 may be configured to allow movement of the spacer 10 relative to the messenger cable (not shown), while in other embodiments, top piece 30 may be immobilized with respect to messenger cable (not shown). For example, in some embodiments, top piece may 30 be hingedly connected to a support or messenger cable. In these and other embodiments, top piece 30 may be permitted to move in one or more than one direction with respect to the support or messenger cable. As will be understood upon consideration of the subject disclosure, allowing top piece 30 to move with respect to the support or messenger cable may, in some cases, diminish or prevent buckling of the supported cables. Top piece 30 may be connected to a support or messenger cable by any appropriate technique, such as with any technique mentioned below regarding connecting cable fastening system 302 to a spacer arm.

As illustrated in FIG. 1, each of first, second, and third arm 52, 54, 56 has a distal end 52d, 54d, 56d and a proximal end 52p, 54p, 56p. The proximal ends 52p, 54p, 56p of the first, second, and third arms 52, 54, 56 are connected to the top piece 30, either directly or indirectly. The first and second arms 52, 54 may each be arranged at approximately 30° from third arm 56, forming an inverted V shape relative to third arm 56, as shown in FIG. 1.

The spacer device 10 may be constructed using high density polyethylene or other electrical insulating materials with or without the inclusion of fiberglass. Other suitable materials may be used for the construction of the various parts of the spacer, including but not limited to silicon rubber, or other polymeric insulating materials. While the spacer device may be of any suitable dimension, a particularly preferred dimension for use with 50 kV-69 kV transmission cables may be approximately at least ten percent larger than spacers used for lower voltage applications. In some example embodiments, the length of the first and second arms 52, 54 may each be approximately forty-two to sixty-two inches, or, in some embodiments, may be about forty-five inches. The length of the entire spacer apparatus, from top to bottom may be approximately sixty-five to ninety-five inches, or about seventy-eight inches, in some embodiments. The distance D1 between first and second cables 20, 22 may be approximately thirty-eight to fifty-four inches, or approximately forty-six inches, in some embodiments. The distance between either of first or second cable 20, 22 and third cable 24 may be between approximately thirty and forty-five inches, and, in some cases, may be approximately thirty-nine inches. Such dimensions are meant to be approximate and not exact, therefore the inventive concepts include similar devices of approximately the dimensions detailed herein.

Figure 2A:
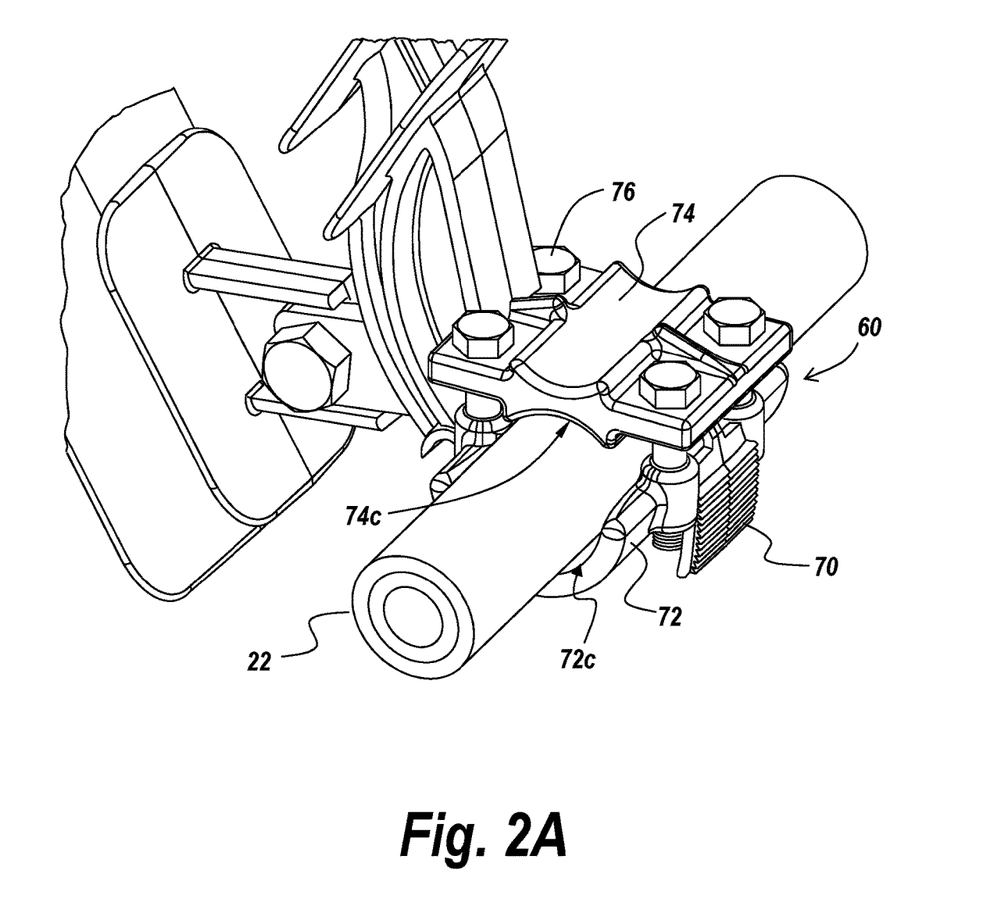
FIG. 2A is a view of a cable fastening system which may be used in accordance with embodiments of the present disclosure.

FIG. 1 also shows cable fastening system 60 located at each of the distal ends 52d, 54d, 56d of the first, second, and third arms 52, 54, 56 of spacer 10. FIG. 2A provides a closer view of an example cable fastening system 60, in accordance with some example embodiments. In some embodiments of the subject disclosure, a cable fastening system 60 may comprise a cable clamp 70, and each cable clamp 70 may include a cable seat portion 72, a removable top portion 74, and at least one fastener 76 for removably connecting the removable top portion 74 to the cable seat portion 72. Fastener 76 may be a bolt (as shown in FIG. 2A) or any other appropriate device configured to connect removable top portion 74 to cable seat portion 72. According to aspects of the subject disclosure, fastener 76 may include an insulating material, and while such material may be the same as the material used for the arms, some embodiments may include other suitable material.

In the example cable fastening system 60 shown in FIG. 2A, the illustrated cable clamp 70 includes four fasteners 76, however it is contemplated that greater or fewer than four fasteners may be used to attach top portion 74 to cable seat portion 72. As illustrated in FIG. 2A, cable seat portion 72 of clamp 70 is integral with the distal end of the pictured spacer arm, although it may be possible to for the cable seat portion 72 to be removable from the spacer arm and/or cable seat portion 72. It is further contemplated that top portion 74 may be removably or permanently attached to the distal end of a spacer arm, in some example embodiments. Cable clamp 70 may be formed of any appropriate material. For example, in some embodiments, cable clamp may comprise metallic and/or polymeric material, including but not limited to stainless steel, and/or polyethylene (including high density polyethylene).

As shown in FIG. 1, third arm 56 may optionally include two segments 56a and 56b, or third arm 56 may be a continuous single segment (not shown), in some example embodiments. In the case where third arm 56 includes two segments, the first and second segments 56a, 56b may be removably attached using one or more connectors 77, as illustrated in FIG. 1. In particular, FIG. 1 illustrates segments 56a and 56b having interfacing regions that may be connected with a fastener, such as bolts, as shown in FIG. 1. In other embodiments, however, first and second segments 56a and 56b may be irremovably attached, such as by welding.

The materials of the cable seat portion 72 and the removable top portion 74 may be the same and, in some embodiments, this material may be the same material used to form an insulative jacket surrounding the high voltage aerial cable supported by the cable clamp 70. For example, such materials may include high density polyethylene. Also, matching materials may help ensure that the dielectric constants of the materials in contact with one another are the same or very nearly the same. Further, according to aspects of the present disclosure, the cable seat 72 may include a first concave face 72c and the removable top portion 74 may include a second concave face 74c. The first and second concave faces, 72c, 74c may be adapted to grip or slidably engage the high voltage aerial cables 20, 22, 24. The concave faces 72c, 74c may have an open curvature from the front ends to the back ends of the cable seat 72 and the removable top portion 74, respectively, so that a conductor cable 22, 24, 26 may be received by the concave faces 72c, 74c.

As will be appreciated by one of ordinary skill in the art upon consideration of the present disclosure, cable clamp 70 may, in some embodiments, be configured to slidably engage or grip a high voltage aerial cable (such as aerial cable 22, illustrated in FIG. 2A). For example, in some cases where it is advantageous to allow for at least some movement of aerial cable 22 between first and second concave faces, 72c, 74c, fasteners 76 may not be fully tightened. However, in embodiments where movement between the high voltage aerial cable 22 and first and second concave faces, 72c, 74c is not desired, fasteners 76 may be fully tightened to allow first and second concave faces, 72c, 74c to grip or otherwise immobilize high voltage aerial cable 22 with respect to first and second concave faces, 72c, 74c.

Figure 2B:
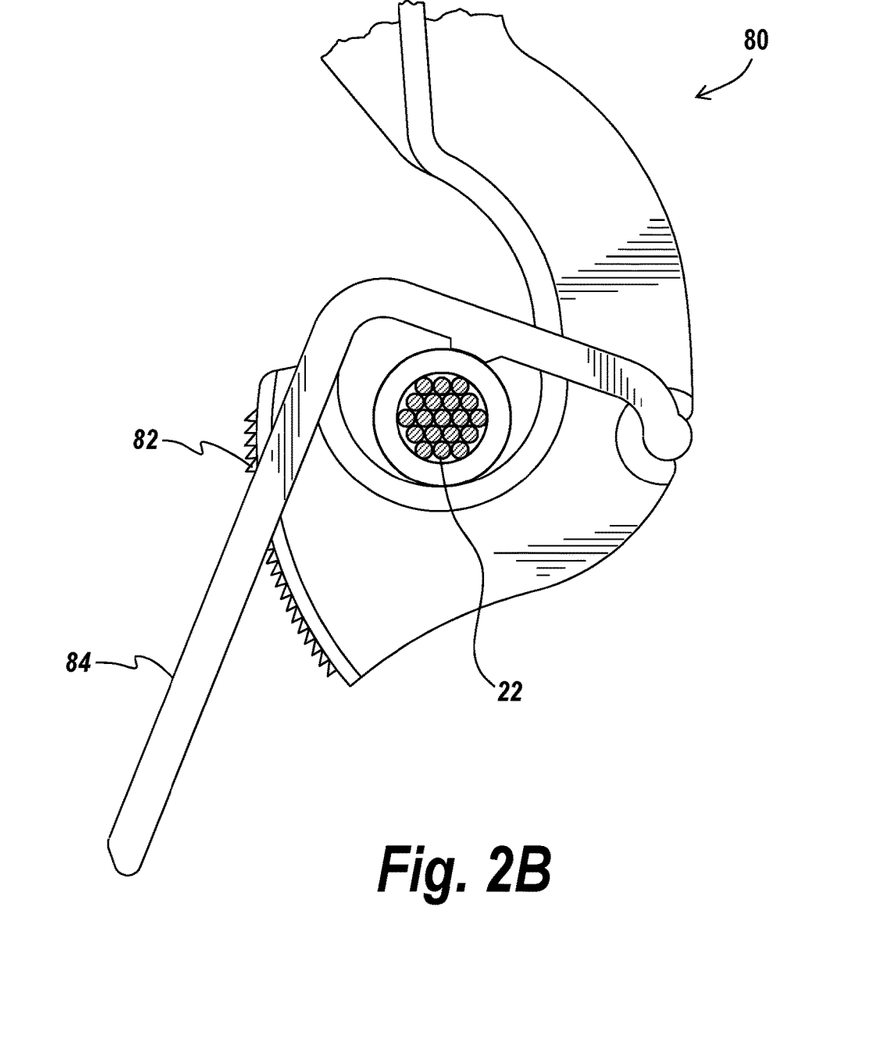
FIG. 2B is a view of an illustrative ratchet and pawl system which may be used in accordance with embodiments of the present disclosure.

According to yet further aspects, each cable fastening system 60 may include a ratchet and pawl system 80 adapted to grip high voltage aerial cables 20, 22, 24. An example ratchet and pawl system 80 is illustrated in FIG. 2B. Ratchet and pawl system 80 can be adapted to be permanently or removably connected to distal ends 52d, 54d, 56d of first, second, and third arms 52, 54, 56. As shown in FIG. 2A, ratchet 82 includes teeth engaged with pawl 84. At present, it is understood based on testing that previous ratchet and pawl systems cannot reliably hold high voltage cables experiencing buckling related to a short circuit, although they could possibly support some stable systems. Advances in materials could possibly improve the reliability of a ratchet and pawl system. In accordance with some example embodiments, a ratchet and pawl system may be used in connection with other features of some example embodiments disclosed herein.

Figure 3:
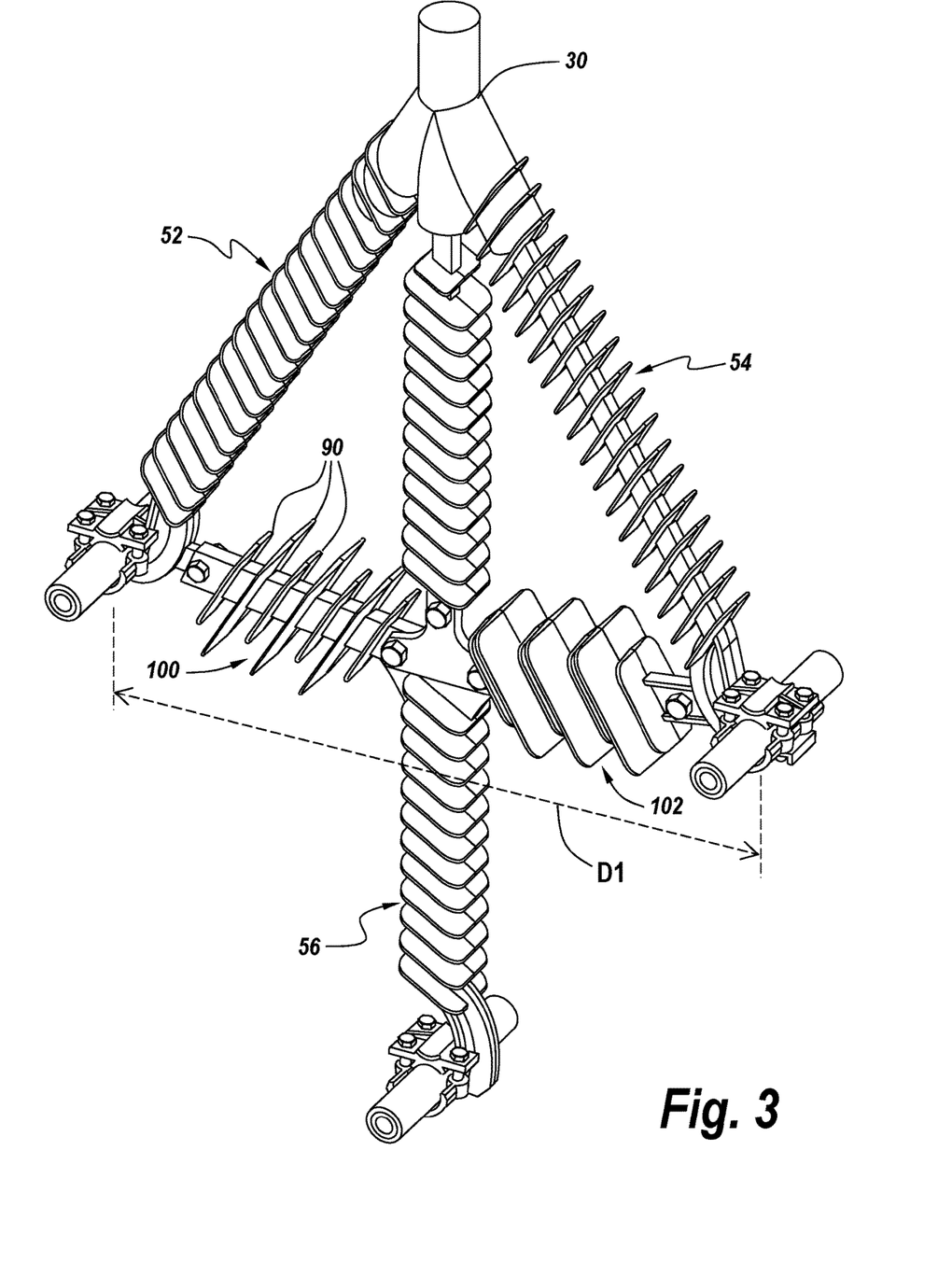
FIG. 3 is a view of an alternative embodiment of a cable retaining device, according to aspects of the present disclosure.

As illustrated in FIGS. 1 and 3, first, second, and third arms 52, 54, 56 may include insulating fins 90 (fins 90 may also be referred to as "sheds" herein). Insulating fins 90 may be fabricated of the same material as arms 52, 54, 56, in some example embodiments. In some cases, fins 90 may be included to diminish electrical effects between cables 20, 22, 24 during power transmission. Fins 90 may be over molded similarly to the fabrication of arms 52, 54, 56, in accordance with some example embodiments. The material of fins 90 may include any electrically insulating material, and in some cases, the material of fins 90 may either be the same or different than the insulator material(s) used on aerial cables 20, 22, 24.

The disclosed example spacers (10 in FIG. 1) may be configured to accommodate any desired cable, such as high voltage aerial cables. In some embodiments, one or more of the cables supported by spacer 10 (e.g., cable 20, 22, and/or 24) is a high voltage aerial cable. In select example embodiments, the first, second, and/or third high voltage aerial cables 20, 22, and/or 24 may be 50 kV to 69 kV transmission cables, or transmission cables adapted to carry a voltage greater-than 69 kV, e.g. 115 kV, or 138 kV transmission cables.

As illustrated in FIG. 1, the distal ends 52d, 54d of the first and second arms 52, 54 may be separated by a first separation distance D1. Separation of first and second arms 52, 54 by distance D1 helps ensure that first and second cables 20, 22 do not come into close proximity with one another when transmitting electric current. In some example embodiments, distance D1 may be less than a total distance between extreme positions of high voltage aerial cables that are disposed on the same plane, thereby narrowing the footprint of prior art three-phase high voltage transmission cables.

FIG. 3 shows an illustrative embodiment of the subject disclosure that utilizes first cross support portion 100 and second cross support portion 102. First and second cross support portions 100, 102 may be connected to the first and second arms 52, 54, respectively, and the first and second cross support portions 100, 102 may, in some embodiments, be connected to the third arm 56, as shown in FIG. 3. Further, the first, second, and third arms 52, 54, 56, and the cross support portions 100, 102 may be fabricated using the same material in some example embodiments. For example, in some embodiments, first, second, and third arms 52, 54, 56 and cross support portions 100, 102 may be formed of fiberglass, over molded with electrically insulating materials including, but not limited to polyethylene, polymers, rubber, and/or similar materials. Cross support portions 100, 102 are illustrated in FIG. 3 as being removably connected to first, second, and third arms, 52, 54, 56, however, in some embodiments, cross support portions 100, 102 may be permanently fixed to spacer 10 in a one-piece design (not shown). Cross support portions 100, 102 may include fins 90 which may be fabricated using the same materials as cross support portions 100, 102. Cross support portions 100, 102 may aid in maintaining distance D1 between first and second arms 52, 54. While the location of attachment of cross support portions 100, 102 to third arm 56 is illustrated as approximately in the middle of third arm 56 in FIG. 3, other locations for attachment are possible. Also, fins (or sheds) 90 are illustrated in FIG. 3 as being disposed parallel to one another, however, in some embodiments may be non-parallel to one another. Additionally, fins 90 may be disposed non-orthogonally or orthogonally to arms 52, 54, 56 and/or cross support portions 100, 102 to which they are attached.

Figure 4:
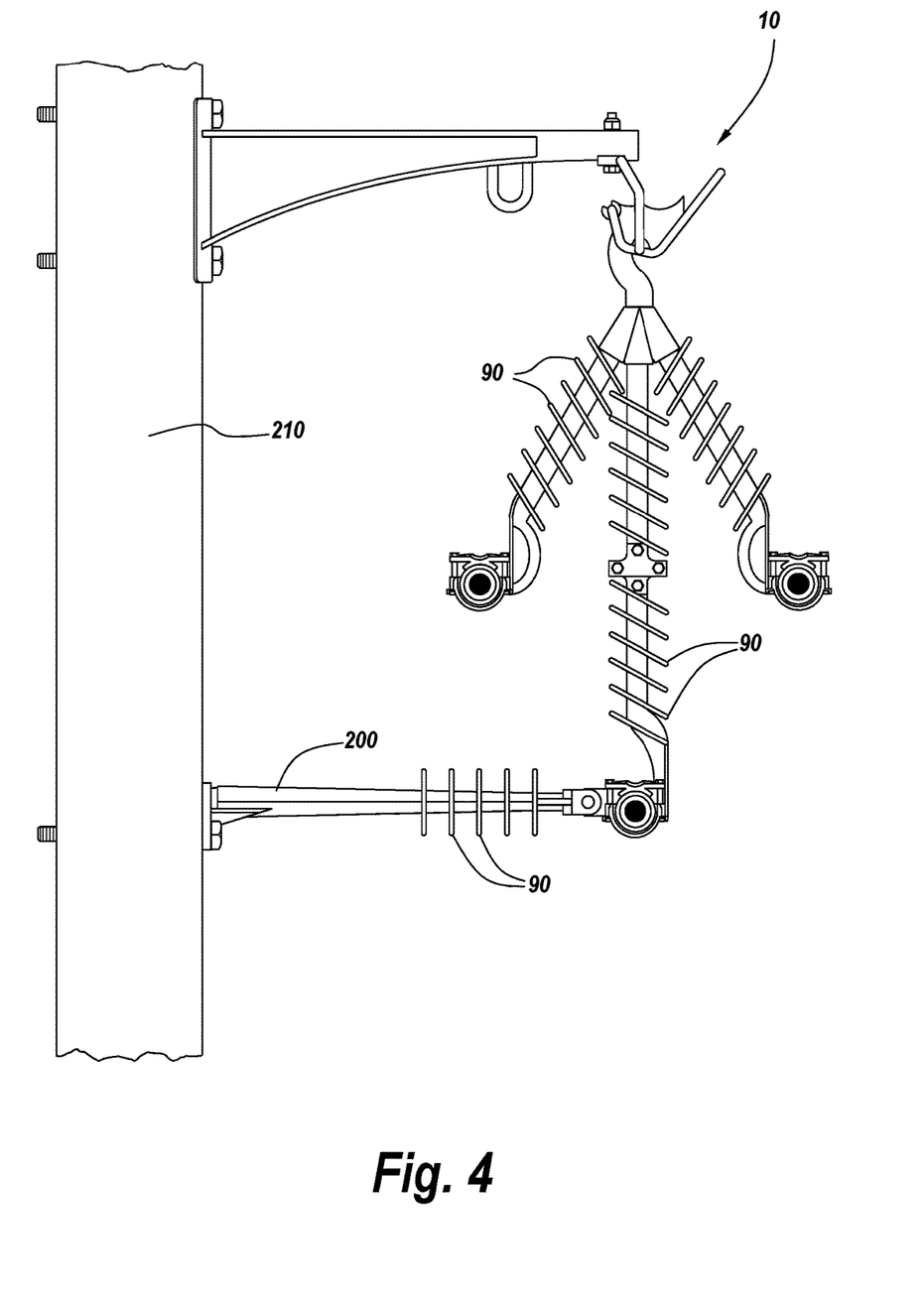
FIG. 4 is a view of an alternative embodiment of a cable retaining device, according to aspects of the present disclosure illustrating a damper arm which may be used to attach a spacer to a structure.

FIG. 4 shows an illustrative embodiment according to aspects of the present disclosure that utilizes a damper arm (or anti-sway arm) 200 to fix spacer 10 to utility pole 210. Damper arm 200 may be attached to any appropriate structure, and utility pole 210 is shown only as an illustrative example. As illustrated, damper arm 200 may be fixed to distal end 56b of third arm 56 of spacer 10, however, it is to be understood that damper arm 200 may be fixed to any appropriate part of spacer 10, either directly or indirectly. Damper arm 200 may optionally include fins 90 and may be constructed of any appropriate material, including, but not limited to fiber glass, high density polyethylene, or other electrically insulating material. Damper arm 200 may include attachment holes to allow attachment to utility pole 210 or to another structure via at least one bolt, screw, nail, or other attachment device.

Figure 5:
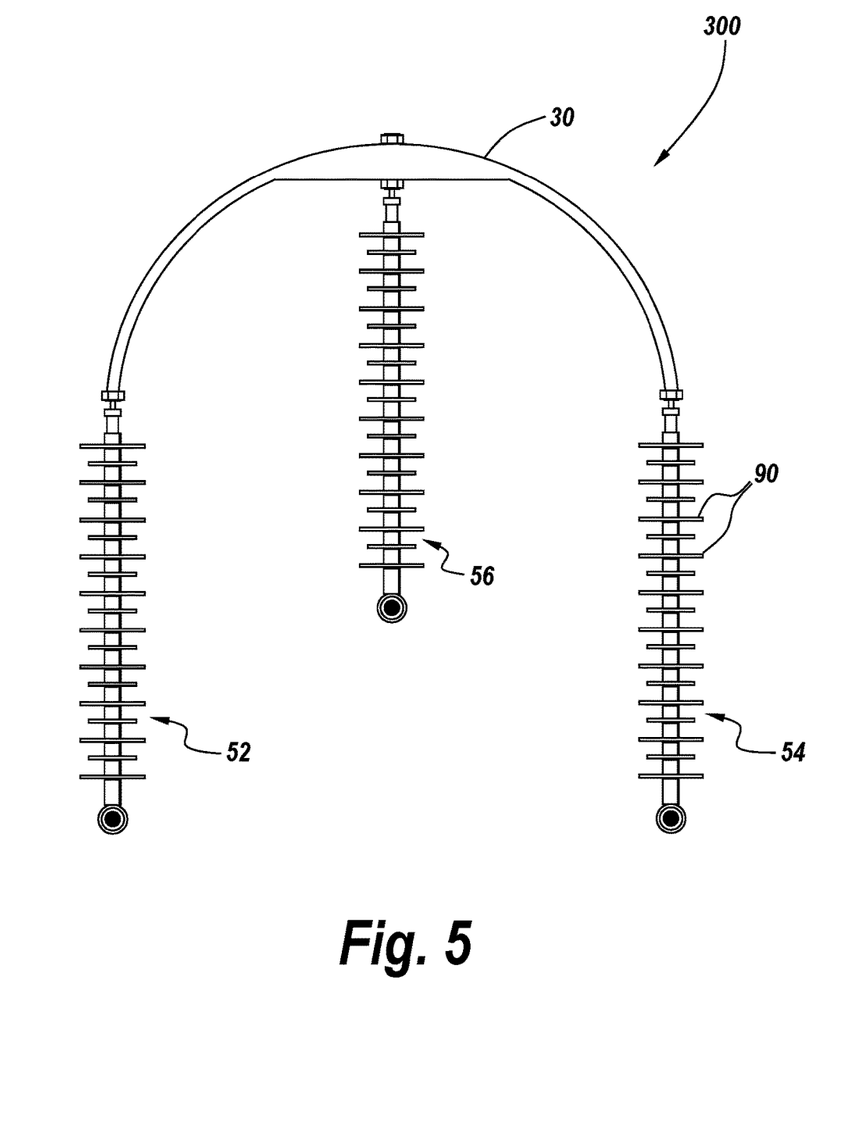
FIG. 5 is a view of an alternative embodiment of a cable retaining device, according to aspects of the present disclosure.

FIG. 5 illustrates an alternative embodiment of a spacer 300, according to aspects of the present disclosure. In particular, FIG. 5 illustrates an example space 300 having a reverse compact triangular configuration. As shown in FIG. 5, spacer device 300 has an arcuate top piece 30 and can have the same or larger vertical and lateral dimensions as spacer device 10. Arcuate top piece 30 may be fabricated using any appropriate material, including, but not limited to crimped metal. Spacer device 300 may be particularly suited for use with 115 kV transmission cables. An illustrative vertical height of spacer device 300 may be between 80 to 90 inches and may, in some cases, be approximately 85 inches. A lateral distance spanning the extreme extent of fins 90 of spacer device 300 may be approximately 70 to 90 inches, and in some cases, may be approximately 80 inches.

In the embodiment of spacer device 300 illustrated in FIG. 5, first and second ends of top piece 30 may be attached to first and second arms 52, 54, while a center portion of top piece 30 may be attached to a third arm 56. First, second, and third arms 52, 54, 56 may be fabricated of any appropriate material as discussed above with respect to the embodiments illustrated in FIGS. 1-4. FIG. 5 illustrates first arm 52 and second arm 54 as being longer than third arm 56. However, in other example embodiments, third arm 56 may be longer than first arm 52 and/or second arm 54. As shown in FIG. 5, first am 52, second arm 54, and/or third arm 56 may include fins 90. Fins 90 may be fabricated using any or all of the same materials previously identified. While fins 90 are illustrated as oriented orthogonally to the lengthwise axes of arms 52, 54, 56, the orientation of fins 90 is not so limited. For example, fins 90 may be disposed at an angle other than 90 degrees relative to the lengthwise axes of the arms 52, 54, 56 or fins 90 may be oriented at different angles on a single arm, or at different angles on different arms. While not illustrated, arms 52, 54, 56 may support cables and mechanisms that attach to cables at the distal ends of arms 52, 54, 56 may be the same as those discussed above with respect to FIGS. 1-4. For example, in some embodiments, first arm 52, second arm 54, and/or third arm 56 may include a cable fastening system 60 as discussed with respect to FIGS. 1 and 2A. In some cases, the reverse compact triangular configuration of example spacer 300 can minimize the amount of raw materials needed to form the spacer, thereby reducing cost. Numerous configurations and variations will be apparent to one of skill in the art in light of the subject disclosure.

Figure 6:
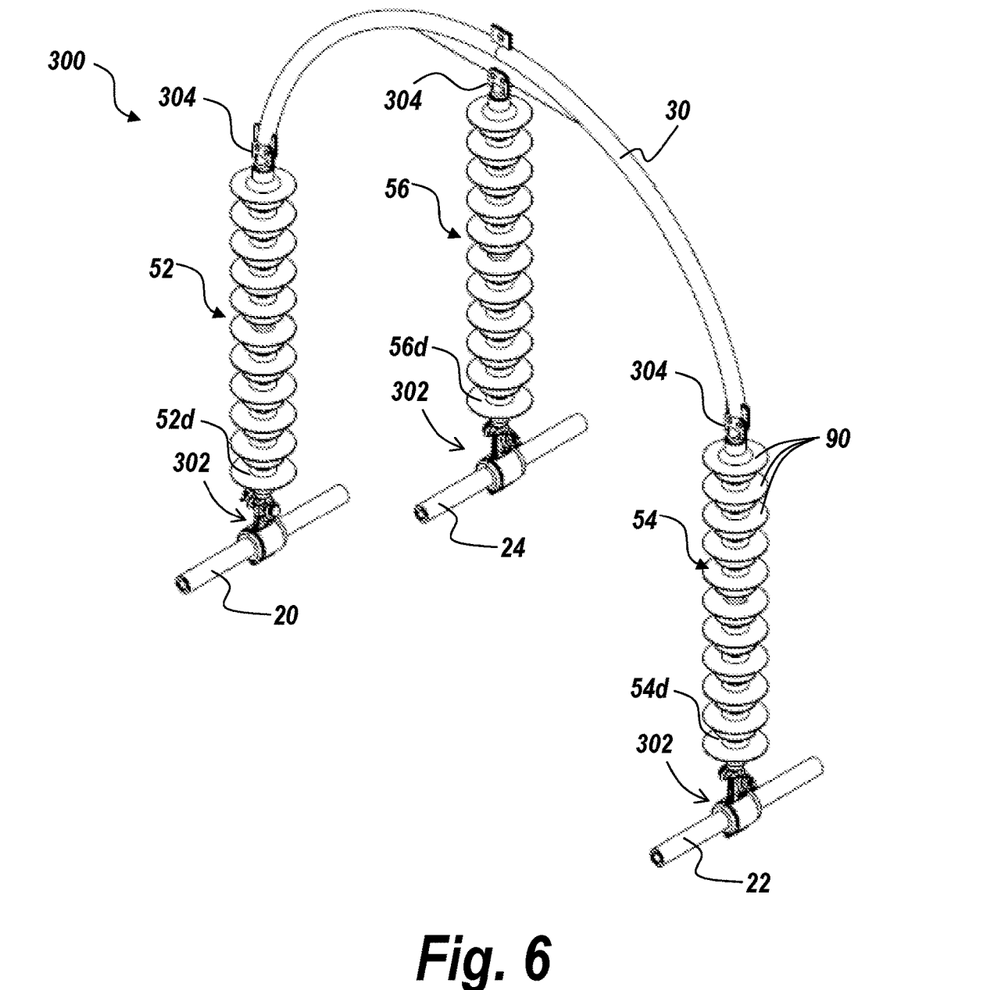
FIG. 6 is a view of an alternative embodiment of a cable retaining device, according to aspects of the present disclosure.

FIG. 6 illustrates an exemplary cable spacer 300 having a first arm 52, a second arm 54, and a third arm 56 attached to top piece 30. First arm, second arm, and third arm 52, 54, 56 may have any features previously described with respect to other embodiments. For example, First, second, and third arms 52, 54, 56 may include insulating fins 90, in some embodiments. First, second, and third arms 52, 54, 56 can be attached to top piece 30 by any appropriate technique, including by fastening with adhesive or with a fastener (e.g., bolt, screws, clamps, or similar devices). FIG. 6 illustrates first, second, and third arms 52, 54, 56 attached to top piece 30 with a fastener 304. Top piece 30 may be shaped as desired, and may, in some embodiments, be linear or non-linear. In some particular embodiments (such as the embodiment shown in FIG. 6) top piece 30 may have an arcuate shape. As shown in FIG. 6, spacer 300 may include one or more cable fastening systems 302 at a distal end 52d, 54d, 56d of first arm, second arm, or third arm 52, 54, 56. For example, FIG. 6 illustrates a cable fastening system 302 attached to first, second, and third arms 52, 54, 56. As explained below in detail, cable fastening system 302 can engage with and retain high voltage aerial cables 20, 22, 24 as shown in FIG. 6.

Figure 7:
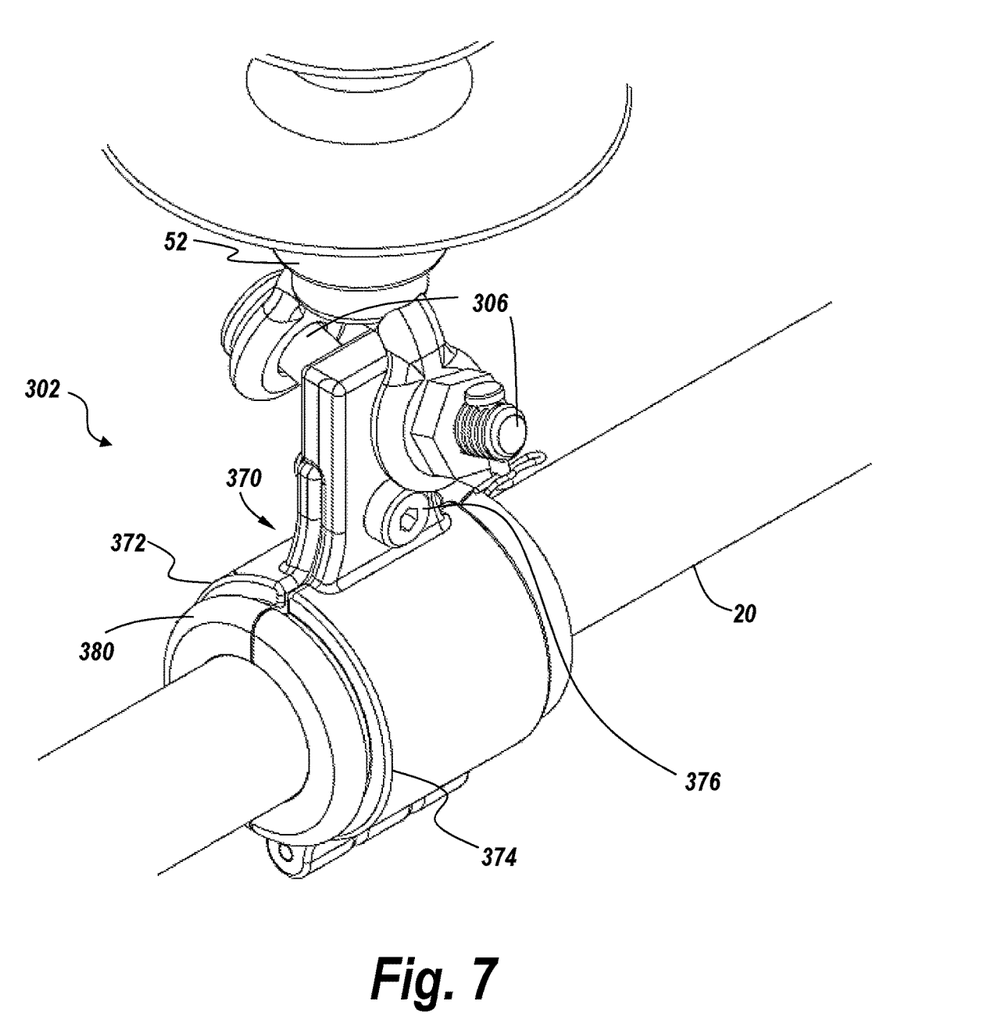
FIG. 7 is a view of a cable fastening system which may be used in accordance with embodiments of the present disclosure.

FIG. 7 provides a close-up view of an exemplary cable fastening system 302. Cable fastening system 302 may include one or more features mentioned with respect to cable fastening system 60, or may include other features, in accordance with some embodiments. As shown in FIG. 7, cable fastening system 302 may include a cable clamp 370 formed of a first side 372, a second side 374, and at least one fastener 376 for connecting the first side 372 to the second side 374 of cable clamp 370. In some embodiments, fastener 376 is a screw, bolt, or other suitable fastener. According to aspects of the subject disclosure, fastener 376 may include an insulating material, and while such material may be the same as the material used for the arms 52, 54, 56, first side 372, or second side 374, some embodiments may include other suitable material.

Cable clamp 370 may also include, in some embodiments, a boot 380 positioned inside the first side 372 and second side 374 of cable clamp 370. Boot 380 may be formed of two approximately equally sized portions, as shown in FIG. 7, with each portion residing in either the first side 372 or the second side 374 of cable clamp 370. When the portions of boot 380 are aligned, boot 380 may have a substantially cylindrical shape, as shown in FIG. 7. Boot 380 may be securely attached to first side 372 and second side 374, in some example embodiments. Boot 380 may be shaped to rigidly retain a high voltage aerial cable, in some embodiments. Boot 380 may be formed of any appropriate material. For example, in some embodiments, boot 380 may comprise material having a dielectric constant nearly the same as or identical to the surrounding material of the retained cable (in FIG. 7, cable 20). In some particular embodiments, for example, boot 380 may comprise polyethylene (such as high density polyethylene).

Cable fastening system 302 may be removably or permanently attached to an arm of the spacer (in FIG. 7, arm 52 is illustrated) using any appropriate technique. In some embodiments, for example, cable fastening system 302 may be hingedly attached to the distal end of a spacer arm. For example, in some such embodiments, cable fastening system 302 may be able to move with respect to the distal end of a spacer arm. The cable clamp 370 may be able to rotate relative to an axis parallel with the cable 20. In some embodiments, for example, the cable clamp 370 may rotate within a plane that contains the arm 52. In other embodiments, the cable clamp 370 may have multiple degrees of freedom.

In addition to possible other benefits, hingedly connecting the cable fastening system 302 to the spacer arm may advantageously allow cable fastening system 302 to move to accommodate cable movement, such as that caused by gusting wind, thereby reducing the overall impact of cable movement. Cable fastening system 302 may be attached to the spacer arm with a hinge, a hinge joint, a ball and socket joint, a condyloid joint, and/or a pivot joint, in some example embodiments. As shown in FIG. 7, cable clamp 370 includes an upper portion with an aperture through which a pin 306 extends, thereby allowing cable clamp 370 to pivot in one or more directions. In the embodiment shown in FIG. 7, pin 306 is positioned in the aperture of cable clamp 370, extends through loop extensions of arm 52 and is secured in place with nuts tightened onto threaded outer portions of pin 306. Numerous variations and configurations will be apparent to those having ordinary skill in the art in light of the present disclosure.

While some exemplary embodiments of a spacer for aerial cables embodying aspects of the subject disclosure have been shown in the drawings, it is to be understood that this disclosure is for the purpose of illustration only, and that various changes in shape, proportion and arrangement of parts as well as the substitution of equivalent elements for those shown and described herein may be made without departing from the spirit and scope of the disclosure as set forth in the appended claims.

What is claimed is:

1. A device for supporting and spacing three-phase power, high voltage aerial cables, the device comprising:
a top piece configured to engage a support cable;
a first arm, a second arm, and a third arm, each arm having a distal end and a proximal end, the proximal ends of the first, second, and third arms connected to the top piece;
a first cable fastening system attached to the distal end of the first arm;
a second cable fastening system attached to the distal end of the second arm; and
a third cable fastening system attached to the distal end of the third arm,
wherein at least one of the first, second, and third cable fastening system is hingedly connected to the distal end of the first, second, or third arm such that the cable fastening system can pivot in more than one direction with respect to the arm to which the cable fastening system is attached.

2. The device of claim 1, wherein the first, second and third cable fastening systems comprise a cable clamp, each cable clamp including:
a cable seat portion;
a removable top portion; and
at least one fastener for removably connecting the top portion to the cable seat portion.

3. The device of claim 2, wherein the cable seat portion includes a first concave face and the removable top portion includes a second concave face, the first and second concave faces adapted to grip or allow movement of a high voltage aerial cable.

4. The device of claim 1, wherein each cable fastening system further comprises a ratchet and pawl system adapted to engage with a high voltage aerial cable.

5. The device of claim 1, wherein the top piece has an arcuate shape.

6. The device of claim 5, wherein the first, second, and third arms are parallel to one another.

7. The device of claim 1, wherein the first, second, and third arms are not parallel to one another.

8. The device of claim 1, wherein the first, second, and third arms each comprise a composite over-molded material.

9. The device of claim 1, further comprising a damper arm fixed to the distal end of the third arm, wherein the damper arm is adapted to be fixed to a structure.

10. The device of claim 1, wherein the first arm and the second arm are configured to accommodate high voltage aerial 115 kV transmission cables.

11. The device of claim 1, further comprising:
a first cross support portion connected to the first arm and the third arm; and
a second cross support portion connected to the second arm and the third arm.

12. The device of claim 11, wherein the first, second, third arms, and the cross support portions comprise fiberglass.

13. A device for supporting and spacing three-phase power, high voltage aerial cables, the system comprising:
first, second, and third high voltage aerial cables;
a top piece configured to be supported by a messenger cable;
a first arm, a second arm, and a third arm, each arm having a distal end and a proximal end, the proximal ends of the first, second, and third arms connected to the top piece; and
a cable fastening system located at each of the distal ends of the first, second, and third arms, each cable fastening system having a cable clamp comprising:
a cable seat portion;
a removable top portion; and
at least one fastener for removably connecting the top portion to the cable seat portion,
wherein the cable fastening system is configured to pivot in more than one direction with respect to the arm to which the cable fastening system is attached.

14. The device of claim 13, wherein each of the cable fastening systems is hingedly connected to its respective arm.

15. The device of claim 13, wherein the cable seat portion includes a first concave face and the removable top portion includes a second concave face, the first and second concave faces adapted to grip or slidably engage a high voltage aerial cable.

16. The device of claim 13, wherein each cable fastening system comprises a ratchet and pawl system adapted to engage a high voltage aerial cable.

17. The device of claim 13, wherein the first, second, and third arms comprise a fiberglass material.

18. The device of claim 13, wherein the first, second, and third arms include insulating fins.

19. The device of claim 13, wherein the first and second high voltage aerial cables are one of 69 kV transmission cables and 115 kV transmission cables.

20. The device of claim 13, further comprising:
- a first cross support portion connected to the first arm and the third arm; and
- a second cross support portion connected to the second arm and the third arm.

* * * * *